(12) United States Patent
Raju

(10) Patent No.: US 7,576,443 B2
(45) Date of Patent: Aug. 18, 2009

(54) METHOD AND APPARATUS FOR GENERATING ELECTRIC POWER

(75) Inventor: Ravisekhar Nadimpalli Raju, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 11/611,703

(22) Filed: Dec. 15, 2006

(65) Prior Publication Data

US 2008/0143182 A1    Jun. 19, 2008

(51) Int. Cl.
*F02D 29/06* (2006.01)
*H02P 9/04* (2006.01)
*F03D 9/00* (2006.01)
*H02H 7/06* (2006.01)
*H02P 9/00* (2006.01)
*H02P 11/00* (2006.01)
*H02K 7/20* (2006.01)
*H02K 17/44* (2006.01)
*H02K 19/38* (2006.01)
*H02K 47/00* (2006.01)

(52) U.S. Cl. .......................... 290/40 F; 290/6; 290/44; 322/27; 322/28; 322/29; 310/112

(58) Field of Classification Search ................ 290/6, 290/40 F, 44; 322/27, 28, 29; 310/112
See application file for complete search history.

(56) References Cited

U.S. PATENT DOCUMENTS

| | | | | |
|---|---|---|---|---|
| 1,861,750 A * | 6/1932 | Mitzlaff | ................ | 318/148 |
| 2,182,646 A * | 12/1939 | Shutt | ................ | 318/771 |
| 2,668,270 A * | 2/1954 | La Baume | ................ | 322/27 |
| 3,483,463 A * | 12/1969 | Smith | ................ | 322/29 |
| 3,768,002 A * | 10/1973 | Drexler et al. | ................ | 322/25 |
| 3,930,175 A * | 12/1975 | Chirgwin | ................ | 310/160 |
| 4,045,718 A | 8/1977 | Gray | ................ | 320/123 |
| 4,153,869 A | 5/1979 | Ragaly | ................ | 322/90 |
| 4,288,723 A * | 9/1981 | Gerry | ................ | 315/209 R |
| 4,293,797 A * | 10/1981 | Gerry | ................ | 315/209 R |
| 4,293,798 A * | 10/1981 | Gerry | ................ | 315/209 R |
| 4,327,701 A * | 5/1982 | Gerry | ................ | 123/598 |
| 4,328,427 A * | 5/1982 | Bond | ................ | 290/3 |
| 4,661,714 A * | 4/1987 | Satterthwaite et al. | ................ | 290/4 R |
| 4,723,105 A | 2/1988 | Matouka et al. | ................ | 320/123 |
| 4,743,828 A * | 5/1988 | Jahns et al. | ................ | 318/810 |
| 4,748,395 A | 5/1988 | Reynolds | ................ | 320/123 |
| 4,780,659 A * | 10/1988 | Bansal et al. | ................ | 322/58 |
| 4,816,736 A | 3/1989 | Dougherty et al. | ................ | 320/116 |
| 5,199,912 A * | 4/1993 | Dade et al. | ................ | 440/6 |
| 5,233,286 A * | 8/1993 | Rozman et al. | ................ | 322/90 |
| 5,424,599 A | 6/1995 | Stroud | ................ | 310/198 |

(Continued)

*Primary Examiner*—Julio C Gonzalez
*Assistant Examiner*—Pedro J Cuevas
(74) *Attorney, Agent, or Firm*—William Scott Andes, Esq.; Armstrong Teasdale LLP

(57) ABSTRACT

A method of generating electric power includes providing at least one open-winding generator having at least one winding, wherein the at least one winding has a first terminal and a second terminal. The method also includes electrically coupling the first terminal to a first electric power electronics apparatus via a first electric bus and electrically coupling the second electric terminal to a second electric power electronics apparatus via a second electric bus. The method further includes inducing and regulating a first voltage on the first electric bus and inducing and regulating a second voltage on the second electric bus.

20 Claims, 11 Drawing Sheets

U.S. PATENT DOCUMENTS

| | | | | |
|---|---|---|---|---|
| 5,684,690 | A * | 11/1997 | Levedahl | 363/178 |
| 5,713,541 | A * | 2/1998 | Schmitz et al. | 246/187 A |
| 5,933,339 | A * | 8/1999 | Duba et al. | 363/71 |
| 6,072,303 | A * | 6/2000 | Nickoladze et al. | 322/20 |
| 6,111,768 | A | 8/2000 | Curtiss | 363/98 |
| 6,134,124 | A * | 10/2000 | Jungreis et al. | 363/34 |
| 6,150,731 | A * | 11/2000 | Rinaldi et al. | 290/1 A |
| 6,175,163 | B1 | 1/2001 | Rinaldi et al. | 290/6 |
| 6,184,593 | B1 * | 2/2001 | Jungreis | 307/64 |
| 6,373,230 | B2 | 4/2002 | Jabaji | 322/28 |
| 6,507,506 | B1 | 1/2003 | Pinas et al. | 363/79 |
| 6,737,762 | B2 * | 5/2004 | Koenig | 307/48 |
| 6,847,129 | B2 * | 1/2005 | McKelvey et al. | 290/52 |
| 6,909,201 | B2 | 6/2005 | Murty et al. | 307/10.1 |
| 7,034,509 | B2 | 4/2006 | Kusko | 322/90 |
| 7,042,110 | B2 * | 5/2006 | Mikhail et al. | 290/44 |
| 7,071,579 | B2 * | 7/2006 | Erdman et al. | 290/55 |
| 7,102,331 | B2 | 9/2006 | Walter et al. | 322/8 |
| 7,233,129 | B2 * | 6/2007 | Erdman et al. | 322/17 |
| 7,339,355 | B2 * | 3/2008 | Erdman et al. | 322/29 |
| 2003/0052565 | A1 * | 3/2003 | Nickoladze et al. | 310/198 |
| 2003/0080622 | A1 * | 5/2003 | Koenig | 307/64 |
| 2003/0178960 | A1 * | 9/2003 | Kassing | 318/430 |
| 2003/0227172 | A1 * | 12/2003 | Erdman et al. | 290/44 |
| 2004/0041480 | A1 * | 3/2004 | Nickoladze et al. | 310/112 |
| 2004/0080164 | A1 * | 4/2004 | McKelvey et al. | 290/52 |
| 2005/0012339 | A1 * | 1/2005 | Mikhail et al. | 290/44 |
| 2005/0116566 | A1 * | 6/2005 | Nickoladze et al. | 310/112 |
| 2006/0145553 | A1 * | 7/2006 | Nickoladze et al. | 310/112 |
| 2007/0012492 | A1 * | 1/2007 | Deng et al. | 180/65.1 |
| 2007/0144194 | A1 * | 6/2007 | Lee | 62/236 |
| 2007/0146477 | A1 * | 6/2007 | Lee | 348/14.01 |
| 2007/0187955 | A1 * | 8/2007 | Erdman et al. | 290/44 |
| 2007/0262670 | A1 * | 11/2007 | Nickoladze et al. | 310/112 |
| 2008/0007121 | A1 * | 1/2008 | Erdman et al. | 307/47 |
| 2008/0012538 | A1 * | 1/2008 | Stewart et al. | 322/89 |
| 2008/0018309 | A1 * | 1/2008 | Erdman et al. | 322/20 |
| 2008/0150384 | A1 * | 6/2008 | Nickoladze et al. | 310/112 |

* cited by examiner

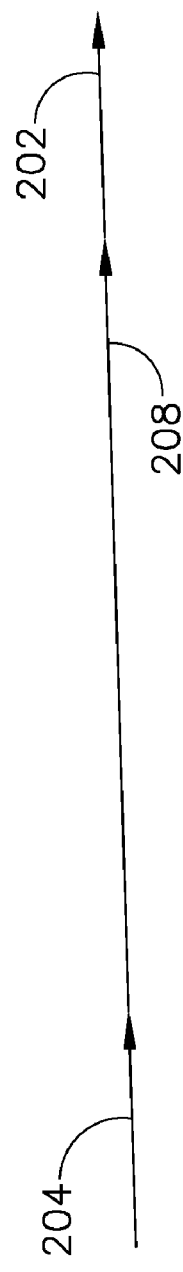
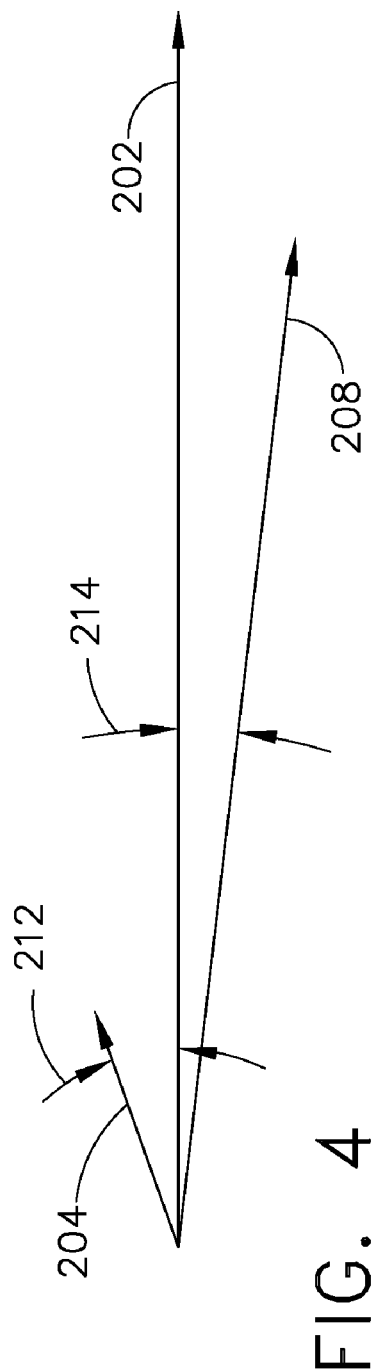
FIG. 3
FIG. 4

US 7,576,443 B2

METHOD AND APPARATUS FOR GENERATING ELECTRIC POWER

BACKGROUND OF THE INVENTION

This invention relates generally to electric generation systems, and more particularly to an electric generation system that includes a combination of generators and converters that are configured to derive multiple voltages without the use of transformers.

At least one known marine vessel includes a generator that is utilized to provide power to an electric distribution system. The electric distribution system includes a plurality of loads which receive power from the buses. To provide power to the loads, known electric distribution systems include a plurality of transformers that are utilized to reduce the voltage level supplied from the generator to a voltage level that is required to operate the loads. For example, at least some marine loads such as the propulsion system are fed at a medium voltage that is between approximately 2.3 kiloVolts (kV) and approximately 13.8 kV, while auxiliary loads, often referred to as hotel or ship service loads, are supplied at a lower voltage that is between approximately 120 volts (V) and approximately 690 V.

While transformers are acceptable for reducing the output voltage from the generator to a lower voltage that is utilized by the various equipment coupled to the bus, known transformers have size/weight constraints. Specifically, marine vessels that include a wide variety of loads, also may require a large quantity of transformers to provide the necessary voltage levels required by the loads. As a result, the combined weight of the transformers increases the overall weight of the marine vessels, thus reducing fuel efficiency and increasing the overall construction and operating costs of the marine vessel. Moreover, transformers utilized with relatively large electric equipment may have a relatively large footprint which may be difficult to accommodate within the limited confines of a marine vessel.

BRIEF DESCRIPTION OF THE INVENTION

In one aspect, a method of generating electric power is provided. The method includes providing at least one open-winding generator having at least one winding, wherein the at least one winding has a first terminal and a second terminal. The method also includes electrically coupling the first terminal to a first electric power electronics apparatus via a first electric bus and electrically coupling the second electric terminal to a second electric power electronics apparatus via a second electric bus. The method further includes inducing and regulating a first voltage on the first electric bus and inducing and regulating a second voltage on the second electric bus.

In another aspect, an electric power distribution system is provided. The system includes at least one first electric power electronics apparatus electrically coupled to a first electric bus. The system also includes at least one second electric power electronics apparatus electrically coupled to a second electric bus. The system further includes at least one open-winding generator electrically coupled in series with the first electric bus and the second electric bus.

In a further aspect, a marine vessel is provided. The vessel includes at least one electric propulsion motor. The vessel also includes an electric power distribution system electrically coupled to the at least one electric propulsion motor. The electric power distribution system includes at least one first electric power electronics apparatus electrically coupled to a first electric bus. The system also includes at least one second electric power electronics apparatus electrically coupled to a second electric bus. The system further includes at least one open-winding generator electrically coupled in series with the first electric bus and the second electric bus.

BRIEF DESCRIPTION OF THE DRAWINGS

FIG. 3 is a graphical view of voltage signals generated within the portion of marine vessel electric power generation and distribution system shown in FIG. 2;

FIG. 4 is a graphical view of voltage signals generated within the portion of marine vessel electric power generation and distribution system shown in FIG. 2;

DETAILED DESCRIPTION OF THE INVENTION

Figure 1:
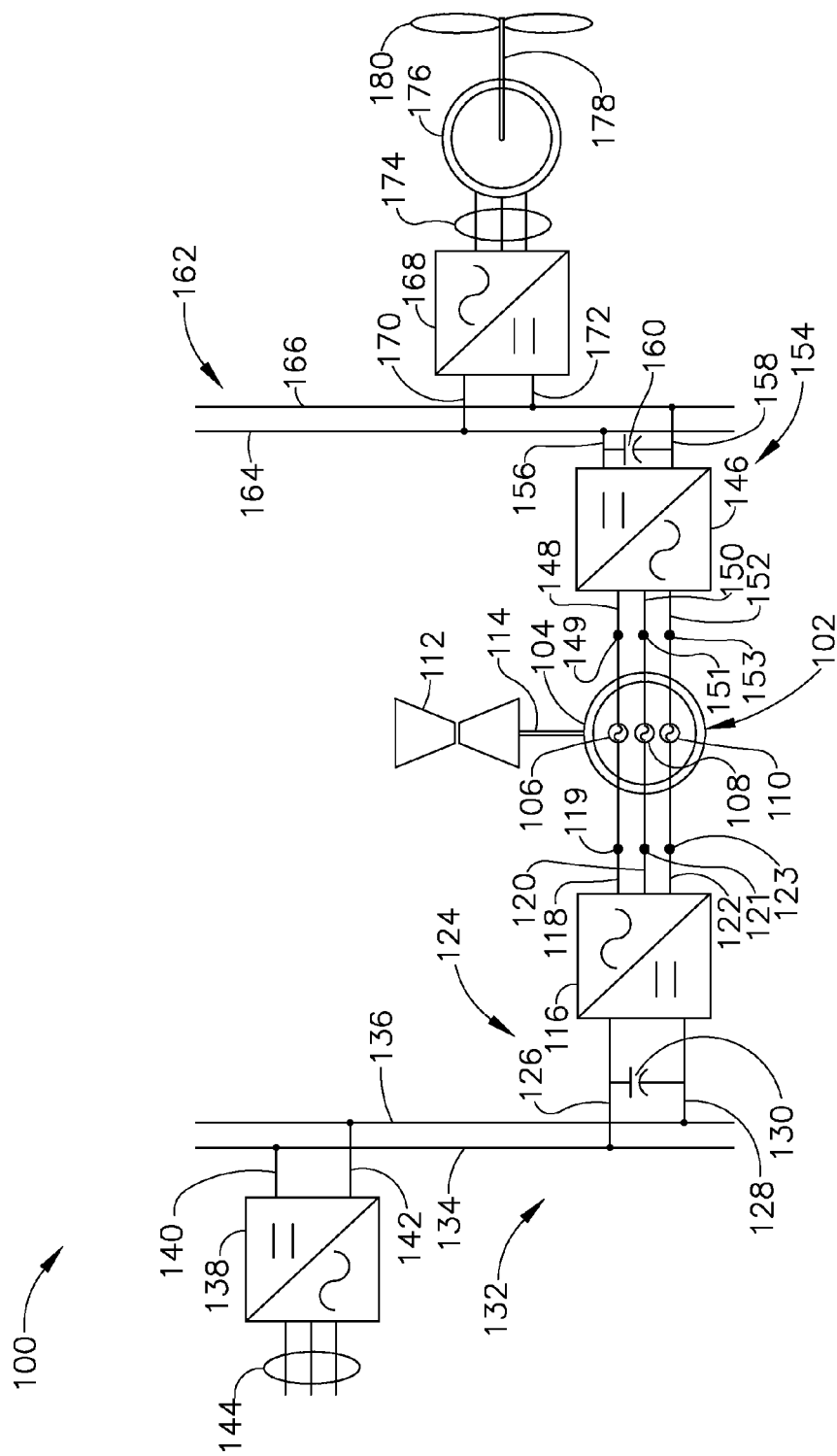
FIG. 1 is a schematic view of a portion of an exemplary marine vessel electric power generation and distribution system.

FIG. 1 is a schematic view of a portion of an exemplary marine vessel electric power generation and distribution system 100. System 100 includes an open-winding generator 102, wherein such generators typically include both of the associated terminals for each generator phase winding being brought out for connection to external buses. This is in contrast to many known generators wherein one end of each of the A-phase lead, the B-phase lead, and the C-phase lead are electrically coupled to form a stator configuration generally known as a delta- (or Δ-) wound machine or a wye- (or Y-) wound machine.

In the exemplary embodiment, generator 102 is a synchronous, three-phase, wound rotor, 36 megawatt (MW), 6600 volts alternating current (VAC), two-pole, 6000 revolutions per minute (RPM) generator that includes a rotor (not shown) and a stator 104. Alternatively, generator 102 is any type of generator including, but not limited to, salient pole generators, double-sided stator generators, and/or doubly-fed induction generators with any number of phases and rated for any power, voltage and rotation values that facilitate operation of system 100 as defined herein. In the exemplary embodiment, the rotor is a wound rotor wherein the associated windings (neither shown) are separately-excited, for example, but not limited to, a salient-pole rotor. Alternatively, generator 102 is a permanent magnet generator that includes a plurality of permanent magnets (not shown) that are coupled to the rotor. The rotor and stator 104 are positioned such that a clearance gap (not shown) (sometimes referred to as an air gap) is defined between stator 104 and the rotor. The rotor is positioned to generate a magnetic field (not shown) with a predetermined number of poles and a predetermined magnetic strength.

Stator 104 includes a plurality of stator windings 106, 108 and 110. The air gap facilitates magnetic coupling of the rotor and stator windings 106, 108 and 110 to generate a predetermined voltage within stator windings 106, 108 and 110 at a predetermined frequency that is determined by the rotor rotational speed as the rotor is rotated within stator 104.

System 100 also includes a drive engine 112 that is rotatably coupled to generator 102 via a shaft 114. In the exemplary embodiment, drive engine 112 is a gas turbine engine. Also, in the exemplary embodiment, drive engine 112 is a substantially constant-speed drive. Alternatively, drive engine 112 is an engine that includes, but is not limited to, a steam turbine engine, a diesel engine, and a wind turbine engine. Also, alternatively, drive engine 112 is a variable speed drive. In the exemplary embodiment, generator 102 is a direct-drive generator, i.e., a hub (not shown) facilitates rotatably coupling shaft 114 to the generator rotor such that shaft 114 drives the generator rotor. Alternatively, a gearbox (not shown) is positioned between drive engine 112 and generator 102 and is used to step up or step down a rotational speed generated by shaft 114 to facilitate attaining the predetermined frequencies within stator windings 106, 108 and 110.

Stator windings 106, 108 and 110 are electrically coupled with a first electric power electronics apparatus, i.e., a first converter 116 via electric conduits 118, 120 and 122, respectively, and terminals 119, 121 and 123, respectively. In the exemplary embodiment, conduits 118, 120 and 122 are a plurality of electrical cables that are configured to transmit predetermined electric power at predetermined currents, voltages and frequencies that are generated by generator 102. In addition or alternatively, conduits 118, 120 and 122 are any electric power transmission device that includes, but is not limited to, bus bars. Conduits 118, 120 and 122 are substantially extensions of stator windings 106, 108 and 110. Specifically, in the exemplary embodiment, each of conduits 118, 120 and 122 include at least one cable for each of three phases associated with generator 102. Alternatively, any number of phases may be associated with generator 102 that facilitates operation of generator 102 as described herein.

In the exemplary embodiment, converter 116 is an active rectifier that converts the alternating current (AC) signals transmitted from stator windings 106, 108, 110 into direct current (DC) signals by AC rectification. Converter 116 uses pulse width modulation (PWM) methods to adjust stator windings 106, 108 and 110 currents and regulate a voltage of a DC link 124 (discussed further below). In the exemplary embodiment, converter 116 includes a plurality of insulated gate bipolar transistor (IGBT) switching devices (not shown) as is known in the art. Alternatively, the switching devices may include, but not be limited to, a plurality of integrated gate commutated thyristors (IGCTs) and a plurality of gate turn-off thyristors (GTOs) (neither shown). Further, alternatively, any type of switching device that facilitates operation of system 100 as described herein may be used. Converter 116 is operated and controlled by a control system (not shown) such that a predetermined firing rate and a predetermined firing duration of the switching devices is provided. Converter 116 includes any filtering apparatus that facilitates operation of system 100 as described herein.

System 100 further includes first DC link 124 that is electrically coupled to converter 116. Link 124 includes a positive conduit 126, a negative conduit 128, and at least one capacitive device, or capacitor 130, electrically coupled therebetween. In the exemplary embodiment, converter 116 is electrically coupled to a single DC link 124. Alternatively, converter 116 is coupled in electrical communication with individual and separate DC links (not shown). Also, in the exemplary embodiment, capacitor 130 facilitates mitigating DC link 124 voltage variations by facilitating mitigation of a DC ripple sometimes associated with three-phase AC rectification. Alternatively, capacitor 130 is one or more capacitors configured in series or in parallel between conduits 126 and 128. Further, in the exemplary embodiment, conduits 126 and 128 are rail buses. Alternatively, conduits 126 and 128 are any electric power transmission device that includes, but is not limited to, bus bars and cables. Moreover, in the exemplary embodiment, DC conduits 126 and 128 are configured to have positive and negative voltage values, respectively, that are substantially centered around a ground value of approximately zero volts. Therefore, the architecture of system 100 does not facilitate introduction of common mode voltage issues that include, but are not limited to, generation of electrical interference signals. In the exemplary embodiment, link 124 is configured to be energized to approximately 1000 volts DC (VDC) and is therefore a low voltage DC link.

System 100 also includes a "ship service" DC bus 132 that is electrically coupled to first DC link 124. Specifically, bus 132 includes a positive conduit 134 and a negative conduit 136 that are electrically coupled to positive conduit 126 and negative conduit 128, respectively. Capacitive devices (not shown) may be positioned between conduits 134 and 136 in a manner similar to capacitor 130. Bus 132 is configured to be routed throughout predetermined portions of the marine vessel. In the exemplary embodiment, bus 132 is configured to be energized to approximately 1000 VDC and is therefore a low voltage DC bus. In the exemplary embodiment, conduits 134 and 136 are a plurality of bus bars. In addition or alternatively, conduits 134 and 136 are any electric power transmission device that includes, but is not limited to, electrical cables.

System 100 further includes at least one ship service converter 138 that is electrically coupled to bus 132. Specifically, converter 138 includes a positive conduit 140 and a negative conduit 142 electrically coupled to positive conduit 134 and negative conduit 136, respectively. In the exemplary embodiment, conduits 140 and 142 are a plurality of bus bars. In addition or alternatively, conduits 140 and 142 are any electric power transmission device that includes, but is not limited to, electrical cables. System 100 also includes a plurality of ship service AC conduits 144 electrically coupled to converter 138. In the exemplary embodiment, there are three conduits 144, i.e., one for each phase, wherein conduits 144 are configured to be routed throughout predetermined portions of the marine vessel and are also configured to be energized to approximately 450 VAC and is therefore a low voltage AC bus. System 100 is configured to include a plurality of electrical distribution and conditioning equipment that can feed ship service loads from conduits 144.

Converter 138 is an inverter that converts the DC signals transmitted along conduits 126, 128, 134, 136, 140 and 142 into AC signals. Converter 138 uses PWM methods to receive DC signals from conduits 140 and 142 and convert them in three-phase AC signals for transmission along conduits 144.

In the exemplary embodiment, converter 138 includes a plurality of IGBT switching devices (not shown) as is known in the art. Alternatively, the switching devices may include, but not be limited to, a plurality of IGCTs and a plurality of GTOs (neither shown). Further, alternatively, any type of switching device that facilitates operation of system 100 as described herein may be used. Converter 138 is operated and controlled by a control system (not shown) such that a predetermined firing rate and a predetermined firing duration of the switching devices is provided. Converter 138 includes any filtering apparatus that facilitates operation of system 100 as described herein.

Stator windings 106, 108 and 110 are also electrically coupled with a second electric power electronics apparatus, i.e., a second converter 146 via electric conduits 148, 150 and 152, respectively, via terminals 149, 151 and 153, respectively. In the exemplary embodiment, conduits 148, 150 and 152 are a plurality of electrical cables that are configured to transmit predetermined electric power at predetermined currents, voltages and frequencies that are generated by generator 102. In addition or alternatively, conduits 148, 150 and 152 are any electric power transmission device that includes, but is not limited to, bus bars. Conduits 148, 150 and 152 are substantially extensions of stator windings 106, 108 and 110. Specifically, in the exemplary embodiment, each of conduits 148, 150 and 152 include at least one cable for each of three phases associated with generator 102. Alternatively, any number of phases may be associated with generator 102 that facilitates operation of generator 102 as described herein.

Converter 146 is an active rectifier that converts the AC signals transmitted from stator windings 106, 108, 110 into DC signals by AC rectification. Converter 146 used pulse width modulation (PWM) methods to adjust stator windings 106, 108, and 110 currents and regulate the voltage of a DC link 154 (discussed further below). In the exemplary embodiment, converter 146 includes a plurality of IGBT switching devices (not shown) as is known in the art. Alternatively, the switching devices may include, but not be limited to, a plurality of IGCTs and a plurality of GTOs (neither shown). Further, alternatively, any type of switching device that facilitates operation of system 100 as described herein may be used. Converter 146 is operated and controlled by a control system (not shown) such that a predetermined firing rate and a predetermined firing duration of the IGBT devices is provided. Converter 146 includes any filtering apparatus that facilitates operation of system 100 as described herein.

System 100 further includes a second DC link 154 electrically coupled to converter 146. Link 154 includes a positive conduit 156, a negative conduit 158, and at least one capacitive device, or capacitor 160, electrically coupled therebetween. In the exemplary embodiment, converter 146 is electrically coupled to a single DC link 154. Alternatively, converter 146 is coupled in electrical communication with individual and separate DC links (not shown). Also, in the exemplary embodiment, capacitor 160 facilitates mitigating DC link 154 voltage variations by facilitating mitigation of a DC ripple sometimes associated with three-phase AC rectification. Alternatively, capacitor 160 is one or more capacitors configured in series or in parallel between conduits 156 and 158. Further, in the exemplary embodiment, conduits 156 and 158 are rail buses. Alternatively, conduits 156 and 158 are any electric power transmission device that includes, but is not limited to, bus bars and cables. Moreover, in the exemplary embodiment, DC conduits 156 and 158 are configured to have positive and negative voltage values, respectively, that are substantially centered around a ground value of approximately zero volts. In the exemplary embodiment, link 154 is configured to be energized to approximately 10,000 VDC and is therefore a medium voltage DC link.

System 100 also includes a ship's propulsion DC bus 162 that is electrically coupled to second DC link 154. Specifically, bus 162 includes a positive conduit 164 and a negative conduit 166 that are electrically coupled to positive conduit 156 and negative conduit 158, respectively. Capacitive devices (not shown) may be positioned between conduits 164 and 166 in a manner similar to capacitor 160. Bus 162 is configured to be routed throughout predetermined portions of the marine vessel. In the exemplary embodiment, bus 162 is configured to be energized to approximately 10,000 VDC and is therefore a medium voltage DC bus. In the exemplary embodiment, conduits 164 and 166 are a plurality of bus bars. In addition or alternatively, conduits 164 and 166 are any electric power transmission device that includes, but is not limited to, electrical cables.

System 100 further includes at least one ship's propulsion converter 168 that is electrically coupled to bus 162. Specifically, converter 168 includes a positive conduit 170 and a negative conduit 172 electrically coupled to positive conduit 164 and negative conduit 166, respectively. In the exemplary embodiment, conduits 170 and 172 are a plurality of bus bars. In addition or alternatively, conduits 170 and 172 are any electric power transmission device that includes, but is not limited to, electrical cables. System 100 also includes a plurality of ship's propulsion AC conduits 174 electrically coupled to converter 168. In the exemplary embodiment, there are three conduits 174, i.e., one for each phase, wherein conduits 174 are configured to be routed throughout predetermined portions of the marine vessel. In the exemplary embodiment, conduits 174 are also configured to be energized to approximately 6600 VAC and is therefore a medium voltage AC bus. Alternatively, conduits 174 are configured to be energized to approximately 4160 VAC which is still considered as a medium voltage AC bus.

Converter 168 is an inverter that converts the DC signals transmitted along conduits 156, 158, 164, 166, 170 and 172 into AC signals. Converter 168 uses PWM methods to receive DC signals from conduits 170 and 172 and convert them in three-phase AC signals for transmission along conduits 174. In the exemplary embodiment, converter 168 includes a plurality of IGBT switching devices (not shown) as is known in the art. Alternatively, the switching devices may include, but not be limited to, a plurality of IGCTs and a plurality of GTOs (neither shown). Further, alternatively, any type of switching device that facilitates operation of system 100 as described herein may be used. Converter 168 is operated and controlled by a control system (not shown) such that a predetermined firing rate and a predetermined firing duration of the switching devices is provided. Converter 168 includes any filtering apparatus that facilitates operation of system 100 as described herein.

System 100 also includes an electric propulsion motor 176 that is electrically coupled to converter 168 via conduits 174. In the exemplary embodiment, motor 176 is a permanent magnet, 36 MW, multi-phase, 6600 VAC, 100-pole, 120 RPM motor. Alternatively, motor 176 is any motor that facilitates operation of system 100 as described herein. Motor 176 is rotatably coupled to a propulsion shaft 178 and screw 180. Motor 176 is configured to rotate screw 180 via shaft 178. Converter 168 is configured to control the direction and speed of rotation of motor 176 and thereby control the speed and direction of shaft 178 and screw 180.

An exemplary method of generating electric power includes providing open-winding generator 102 having windings 106, 108, and 110, wherein windings 106, 108, and 110 each have first terminals 119, 121, and 123, respectively, and second terminals 149, 151, and 153, respectively. The method also includes electrically coupling first terminals 119, 121 and 123 to first converter 116 via first electric conduits 118, 120, and 122, respectively. The method further includes electrically coupling second terminals 149, 151 and 153 to second converter 146 via second electric conduits 148, 150, and 152, respectively. The method also includes inducing and regulating a first voltage on first electric conduits 118, 120 and 122 and inducing and regulating a second voltage on second electric conduits 148, 150 and 152 by controlling generator 102 and converters 116 and 146.

Figure 2:
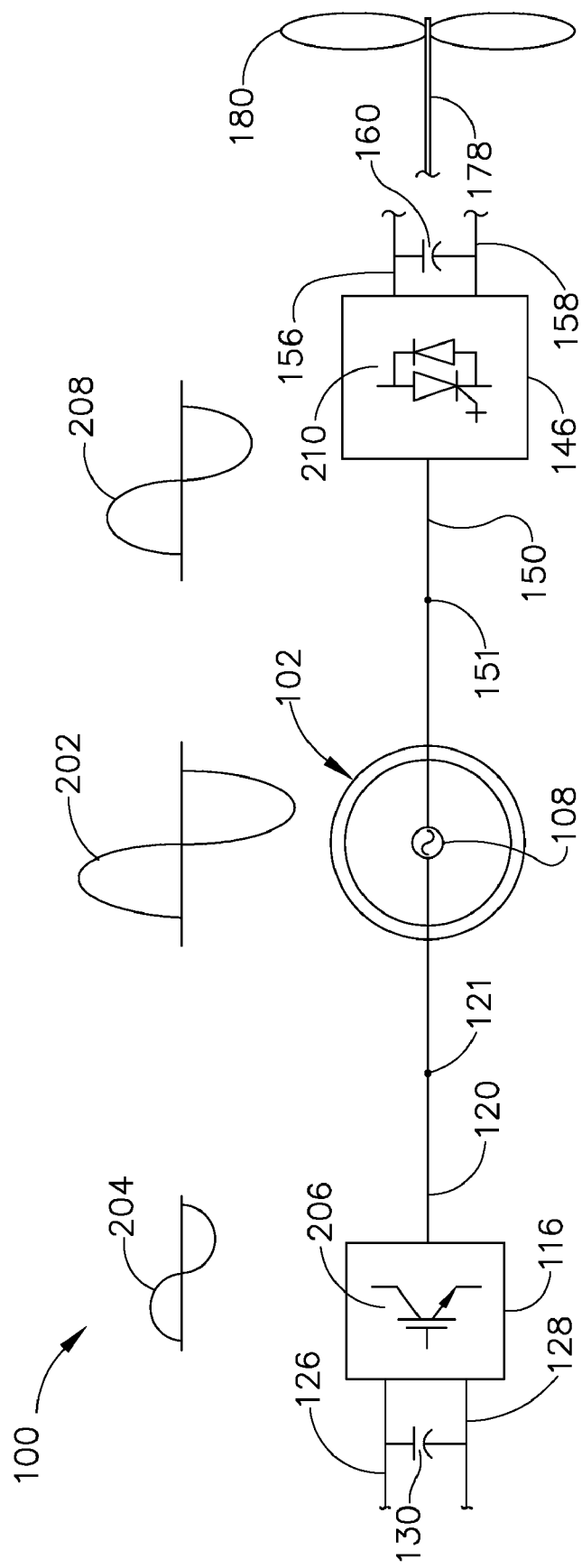
FIG. 2 is a schematic view of a portion of the marine vessel electric power generation and distribution system shown in FIG. 1.

FIG. 2 is a schematic view of a portion of system 100. In operation, drive engine 112 (shown in FIG. 1) rotatably drives the rotor (not shown) of generator 102. The rotor windings (not shown) positioned on the rotor rotate, thereby forming a rotating magnetic field (not shown) that induces a substantially sinusoidal voltage within windings 106, 108 and 110 (only winding 108 is shown in FIG. 2). A substantially sinusoidal voltage signal 202 induced within winding 108 is illustrated in FIG. 2. At least a portion of signal 202, i.e., substantially sinusoidal voltage signal 204, is transmitted to conduit 120 via terminal 121. Signal 204 is rectified via at least one switching device 206 within converter 116, thereby generating a DC voltage signal (not shown) that is transmitted to ship service AC conduits 144 (shown in FIG. 1) at least partially via conduits 126 and 128 and capacitor 130. Similarly, at least a portion of signal 202, i.e., substantially sinusoidal voltage signal 208, is transmitted to conduit 150 via terminal 151. Signal 208 is rectified via at least one switching device 210 within converter 146, thereby generating a DC voltage signal (not shown) that is transmitted to ship's propulsion AC conduits 174 (shown in FIG. 1) at least partially via conduits 156 and 158 and capacitor 160 to drive shaft 178 and screw 180. Values of signals 204 and 208 sum to values of signal 202 by vectorial addition. The values of signals 202, 204 and 208 are controlled via a control system (not shown) that controls operation of a remainder of the switching devices within converter 116 that are similar to device 206 as well as operation of a remainder of the switching devices within converter 146 that are similar to device 210.

FIG. 3 is a graphical view of voltage signals 202, 204 and 208 generated within the portion of system 100 shown in FIG. 2. FIG. 3 illustrates voltage signals 202, 204 and 208 with all three voltage signals in phase with each other. A value of voltage signal 204 may be represented by $V_{SS}$ (for ship service voltage). Also, a value of voltage signal 208 may be represented by $V_{PROP}$ (for ship's propulsion voltage). Furthermore, a value of voltage signal 202 may be represented by $V_{GEN}$ (for generator voltage). The relationship between voltage signals 202, 204 and 208 (ignoring voltage drops due to cabling) may be represented by the algorithm:

$$V_{GEN} = V_{SS} + V_{PROP} \quad (1)$$

For example, a 7.2 kilovolts AC (kVAC) value for $V_{GEN}$ may be proportioned to a 600 VAC value for $V_{SS}$ and a 6.6 kVAC value for $V_{PROP}$.

FIG. 4 is a graphical view of voltage signals 202, 204 and 208 generated within the portion of system 100 shown in FIG. 2. FIG. 4 illustrates voltage signals 202, 204 and 208 wherein signal 204 has a first phase angle 212 referenced to signal 202 and signal 208 has a second phase angle 214 referenced to signal 202. FIG. 4 illustrates the propulsion portion of system 100 being operated with a slight reactive power component. The relationship between voltage signals 202, 204 and 208 is still represented by vectorial summation algorithm 1 above.

System 100 may be operated in a manner that includes changing the magnitude and angular disposition of $V_{SS}$, $V_{PROP}$ and generator 102 currents to follow the varying ship service load and the marine vessel's propulsion requirements. This manner of operating may be facilitated by reducing an excitation voltage of generator 102 by controlling converters 116 and 146 and has the benefits of reducing potential fault current values in the event of a fault as well as reducing losses within generator 102.

Figure 5:
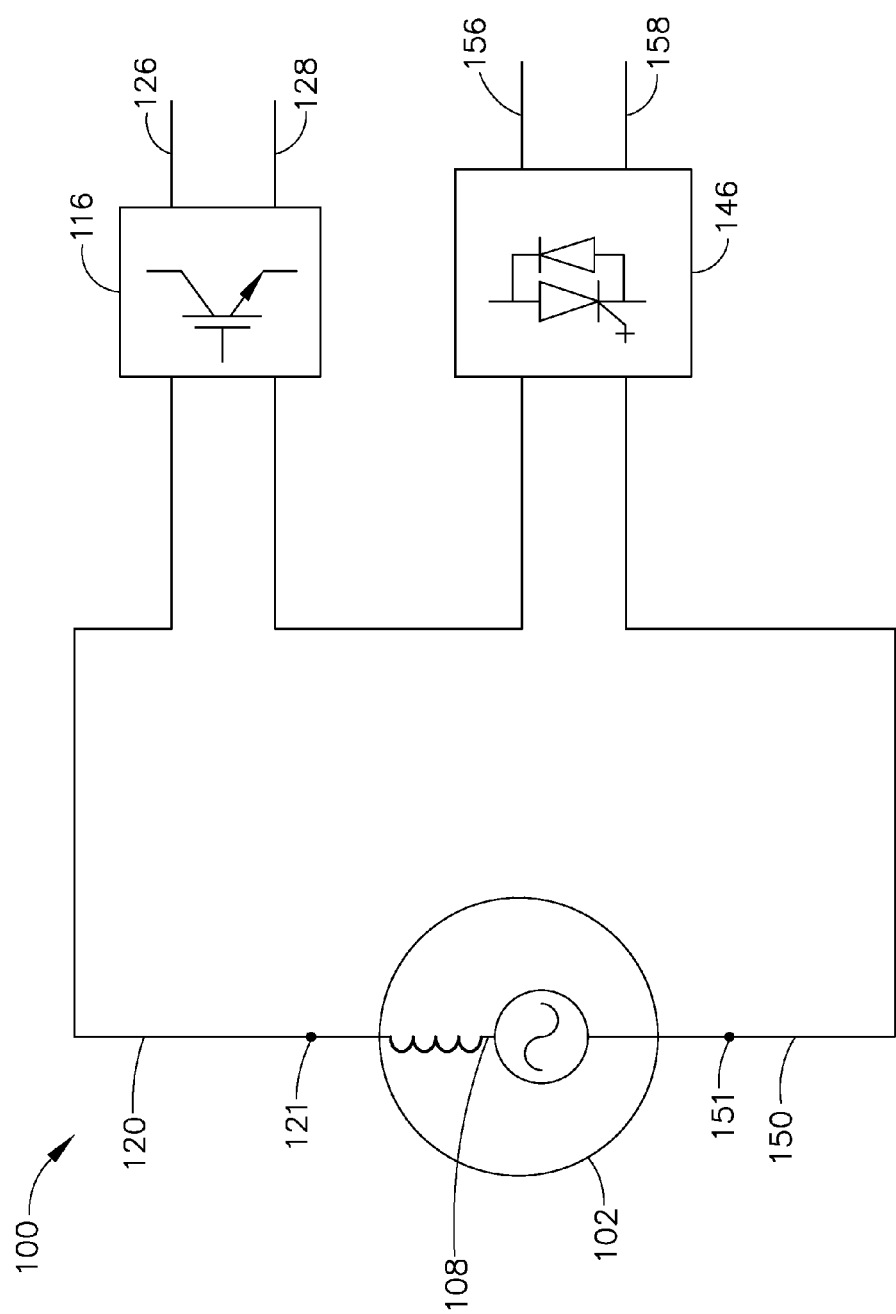
FIG. 5 is a simplified schematic view of a portion of the marine vessel electric power generation and distribution system shown in FIG. 2.

FIG. 5 is a simplified schematic view of a portion of system 100. Generator 102, winding 108, terminals 121 and 151, AC conduits 120 and 150, converters 116 and 146, and DC conduits 126, 128, 156 and 158 are illustrated. In operation, similar to that illustrated in FIG. 4, wherein $V_{SS}$ signal 204 and $V_{PROP}$ signal 208 have phase angles 212 and 214, respectively, a first predetermined electric power value (not shown) is transmitted from generator 102 to converter 116 via conduit 120. Similarly, a second predetermined electric power value (not shown) is transmitted from generator 102 to converter 146 via conduit 150. The first and second electric power values are at least partially modulated by varying phase angles 212 and 214, respectively, as discussed above. For example, in the event that an electric power draw by the load from DC conduits 126 and 128 increases, the voltage value associated with conduits 126 and 128 decreases away from a predetermined voltage value. The control system controls converter 116 such that phase angle 212 is adjusted, thereby facilitating an increase in first electric power transmission to converter 116 such that facilitates restoration of the voltage value on conduits 126 and 128 to substantially the predetermined value. Moreover, generator 102 will be controlled to facilitate the increased first electric power transmission to converter 116 while mitigating any impact on the second electric power flow to converter 146. Therefore, changes to power transmission requirements for ship service needs will not substantially reduce power availability to the vessel's propulsion apparatus. Similarly, changes to power transmission requirements for the ship's propulsion apparatus will not substantially reduce power availability to the vessel's ship service electric loads.

Figure 6:
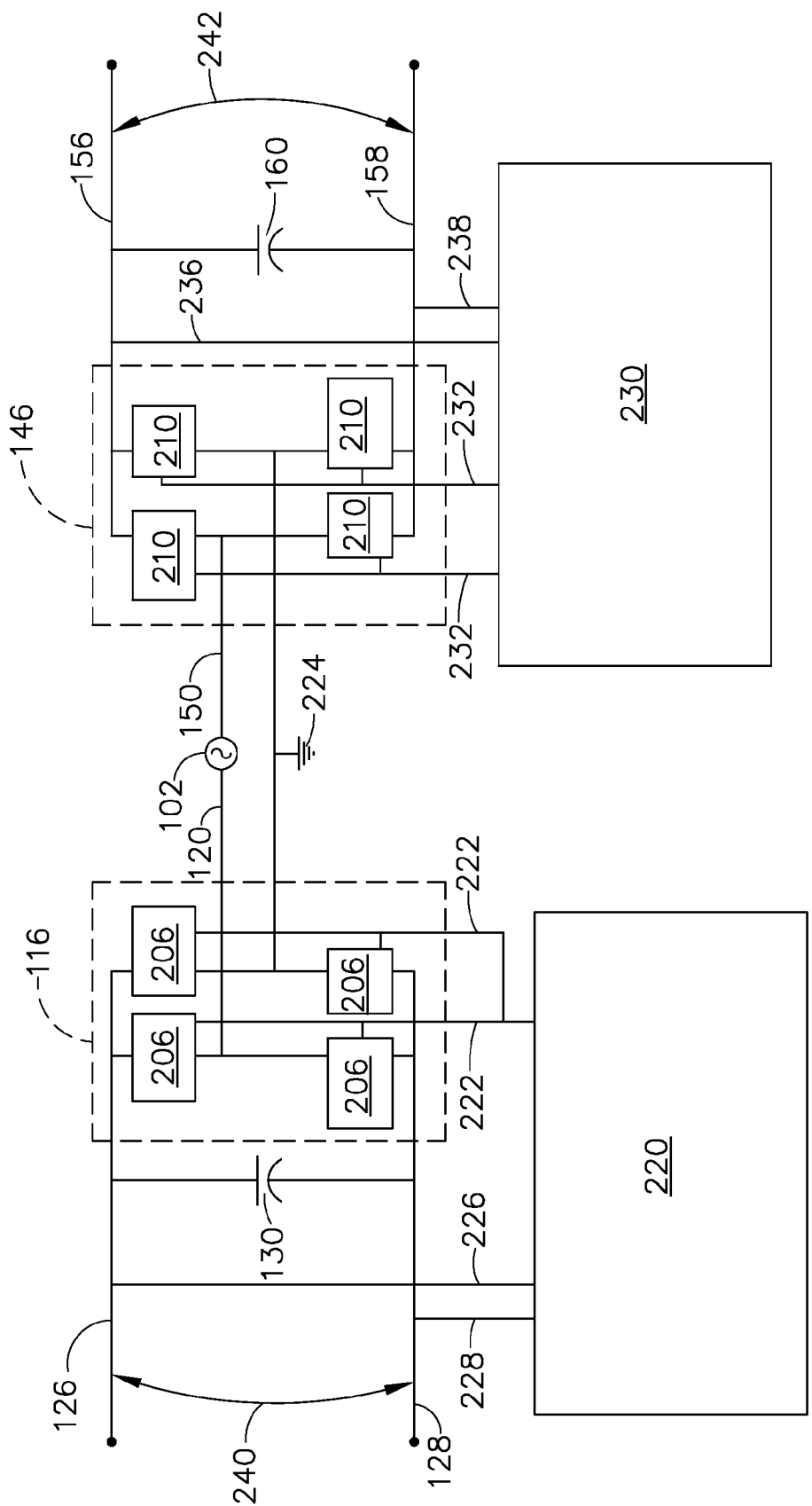
FIG. 6 is a schematic view of a portion of the marine vessel electric power generation and distribution system shown in FIG. 1.

FIG. 6 is a schematic view of a portion of system 100. Only a single-phase of generator 102 is illustrated in FIG. 6 for clarity, wherein the other phases are substantially similar. Generator 102, AC conduits 120 and 150, converters 116 and 146, DC conduits 126, 128, 156 and 158, and capacitors 130 and 160 are illustrated for perspective. System 100 also includes a plurality of switching devices 206 within converter 116. A first pair of switching devices 206 are electrically coupled to AC conduit 120 and are configured to convert the AC power generated within winding 108 (not shown) and transmitted to converter 116 via conduit 120 to a substantially DC signal with a firing rate and firing duration of switches 206 controlled via control system 220. A similar configuration (not shown) exists within converter 116 for AC conduits 118 and 122 (both shown in FIG. 1). Control system 220 is coupled in electronic data communication with converter 116 via data conduits 222 wherein data conduits 222 are configured to transmit bi-directional operational performance data and commands associated with switches 206. A second pair of switches 206 electrically coupled to a ground reference 224 are illustrated for perspective. Control system 220 is coupled to DC conduits 126 and 128 via data conduits 226 and 228, respectively, wherein conduits 226 and 228 are configured to transmit operational performance data associated with conduits 126 and 128 including, but not limited to, voltages and electric currents.

Similarly, system 100 includes a plurality of switching devices 210 within converter 146. A first pair of switching devices 210 are electrically coupled to AC conduit 150 and are configured to convert the AC power generated within winding 108 (not shown) and transmitted to converter 146 via conduit 150 to a substantially DC signal with a firing rate and firing duration of devices 210 controlled via control system 230. A similar configuration (not shown) exists within converter 146 for AC conduits 148 and 152 (both shown in FIG. 1). Control system 230 is coupled in electronic data communication with converter 146 via data conduits 232 wherein data conduits 232 are configured to transmit bi-directional operational performance data and commands associated with devices 210. A second pair of devices 210 electrically coupled to ground reference 224 are illustrated for perspective. Control system 230 is coupled to DC conduits 156 and 158 via data conduits 236 and 238, respectively, wherein conduits 236 and 238 are configured to transmit operational performance data associated with conduits 156 and 158 including, but not limited to, voltages and electric currents. In the exemplary embodiment, control systems 220 and 230 are configured as modules of a larger control system (not shown). Alternatively, control systems 220 and 230 have any configuration that facilitates operation of system 100 as described herein including, but not limited to, coordinated electric power transmission from generator 102 through converters 116 and 146. A first differential voltage 240 between DC conduits 126 and 128 is illustrated for perspective. A second differential voltage 242 between DC conduits 156 and 158 is also illustrated for perspective.

Figure 7:
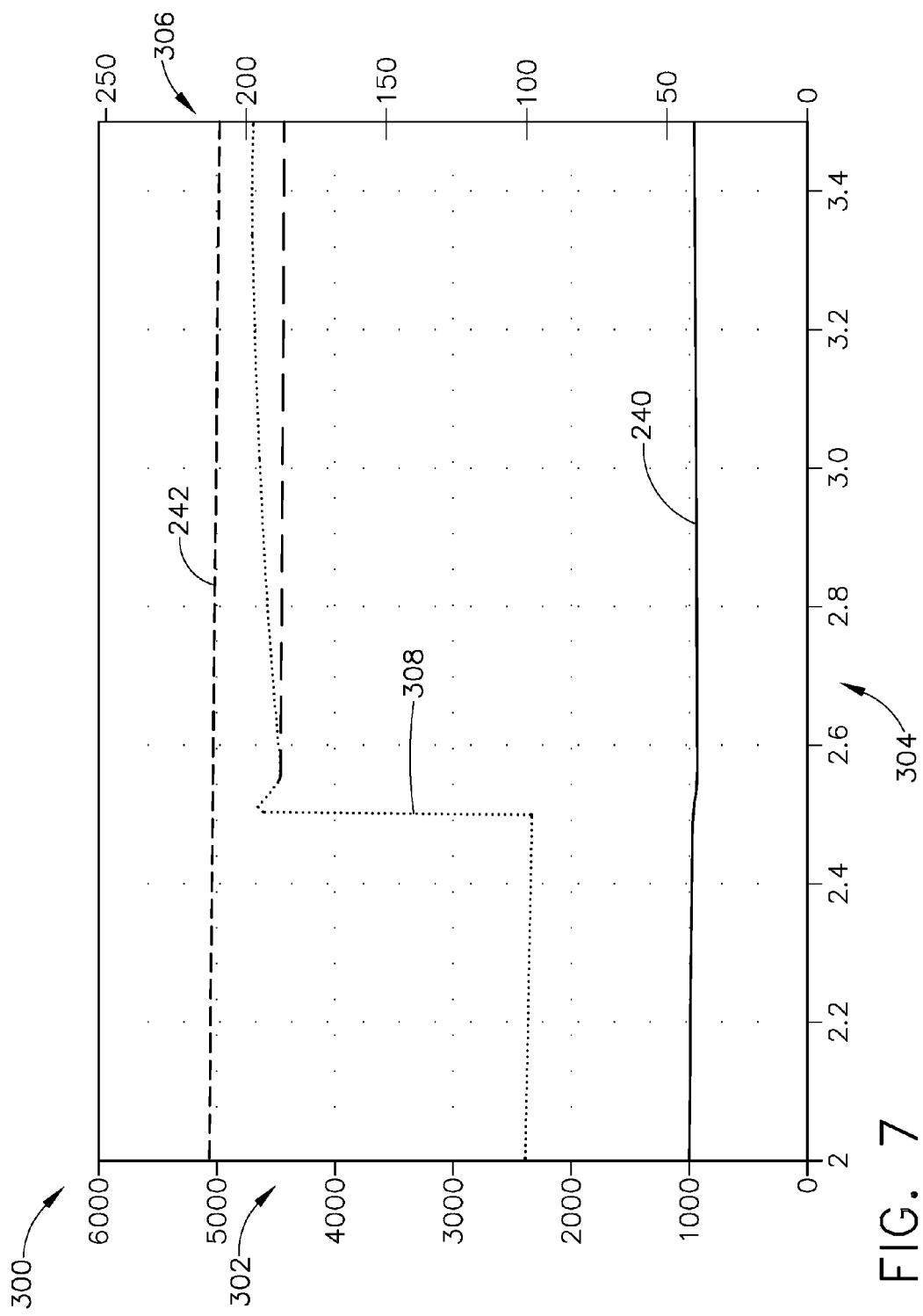
FIG. 7 is a graphical view of exemplary operation of the marine vessel electric power generation and distribution system shown in FIG. 6.

FIG. 7 is a graphical view of exemplary operation of system 100 (shown in FIG. 6). Graph 300 includes a first ordinate (Y-axis) 302 that is configured to represent values of first and second differential voltages 240 and 242 (both also shown in FIG. 6) in units of VDC. Graph 300 also includes an abscissa (X-axis) 304 that is configured to represent time in units of seconds. Graph 300 further includes a second ordinate (Y-axis) 306 that is configured to represent an electric current signal value transmitted through DC conduits 126 and 128, i.e., a ship service DC current 308 as measured in DC amperes.

In operation, generator 102 and converter 116 (both shown in FIG. 6) cooperate to generate first DC differential voltage 240. Also, generator 102 and converter 146 (shown in FIG. 6) cooperate to generate second DC differential voltage 242. In the exemplary embodiment, at time equals approximately 2 seconds (as referenced to abscissa 304), ship service DC voltage is approximately 1000 VDC as shown via first DC voltage differential 240 as referenced to first ordinate 302. Moreover, ship service DC current 308 being transmitted is approximately 100 DC amperes as referenced to second ordinate 306. Furthermore, the marine vessel's propulsion apparatus requires approximately 5000 VDC. At time equaling approximately 2.5 seconds, ship service electric power demand increases substantially instantaneously and such demand induces a substantially instantaneous increase in transmission of ship service DC current 308 from approximately 100 DC amperes to approximately 195 DC amperes. Also, in conjunction with the increase in current 308, a slight decrease in differential voltage 240 is observed from approximately time equals 2.5 seconds to 2.75 seconds. Similarly, DC current 308 decrease during the same time period from approximately 195 DC amperes to approximately 185 DC amperes. Starting at approximately time equaling 2.5 seconds and when the electric transient is sensed by control system 220 (shown in FIG. 6), control system 220 modifies the operation of switching devices 206 (shown in FIG. 6) within converter 116 to restore DC voltage differential 240 to approximately 1000 VDC during the period that includes time equals 2.75 seconds to time equals approximately 3.4 seconds. Control system 220 also cooperates with converter 116 to increase DC current 308 from approximately 185 DC amperes to approximately 197.5 DC amperes in conjunction with DC voltage differential 240 restoration. During the course of the electrical transient, control system 220, control system 230 (shown in FIG. 6), generator 102, converter 116 and converter 146 (shown in FIG. 6) cooperate to mitigate changes to DC voltage differential 242, thereby substantially insulating the vessel's propulsion operations from the ship service electrical transient. Propulsion transients that result in electric transients of system 100 (shown in FIG. 6) are also substantially insulated from ship service electric operations in a similar manner.

Figure 8:
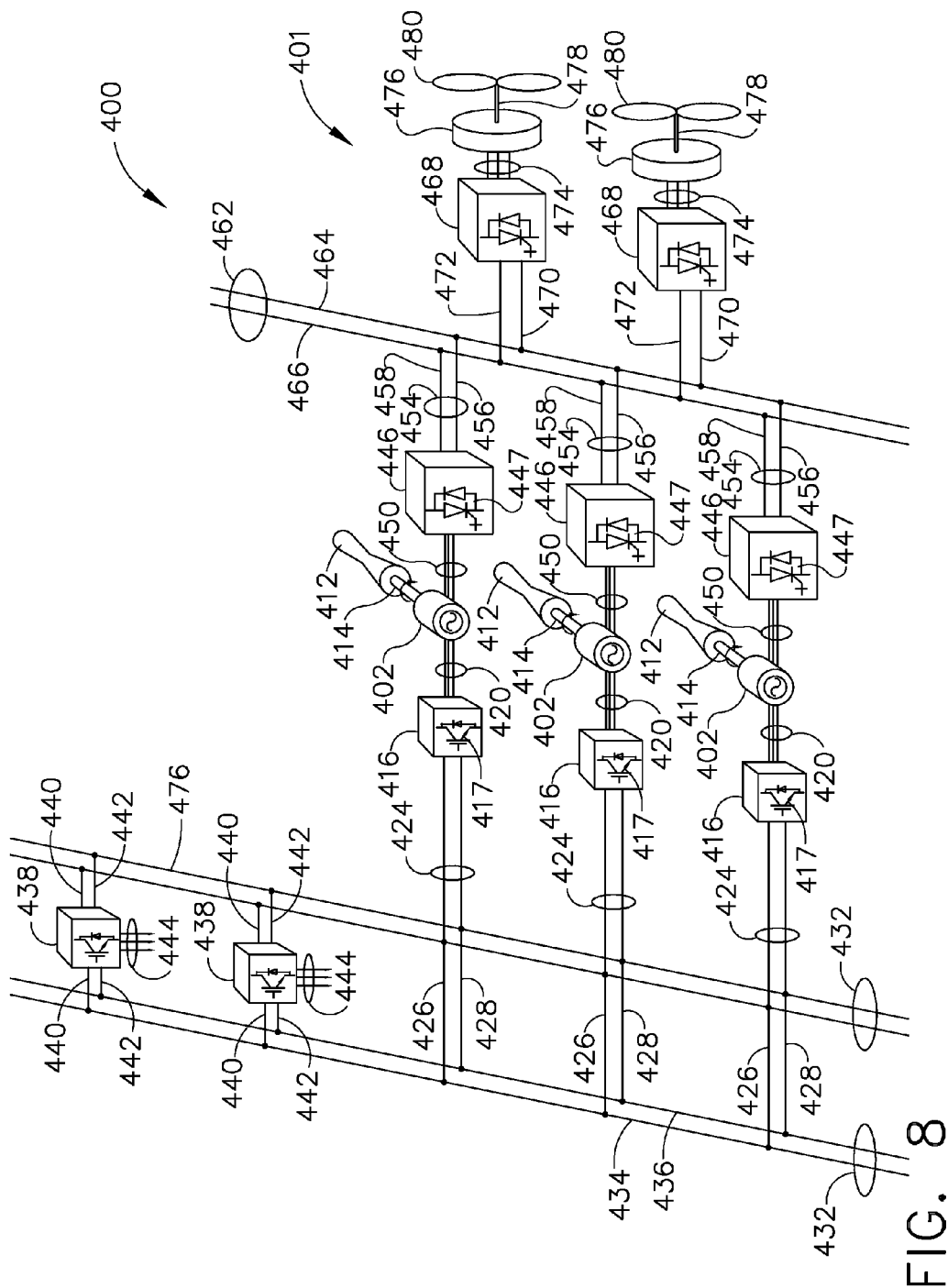
FIG. 8 is a schematic view of an exemplary marine vessel that includes at least a portion of the electric power generation and distribution system shown in FIG. 1.

FIG. 8 is a schematic view of an exemplary marine vessel 400 that includes at least a portion of electric power generation and distribution system 100 (shown in FIG. 1). The term "marine vessel" as used herein is defined as a ship or barge that includes a propulsion system that is utilized to propel the marine vessel through the water. For example, at least one known marine vessel includes a drive train that is coupled to a propeller that is utilized to propel the marine vessel. The drive train may include at least one generator to facilitate providing electric power to an electric motor that is configured to propel the marine vessel through the water. The configuration of the exemplary drive train will be discussed below.

Exemplary marine vessel 400 includes an exemplary marine vessel electric power generation and distribution system 401. System 401 includes a plurality of open-winding generators 402 that are substantially similar to generator 102 (shown in FIG. 1). System 401 also includes a plurality of drive engines 412 that are each rotatably coupled to generators 402 via a plurality of shafts 414. In the exemplary embodiment, drive engines 412 and shafts 414 are substantially similar to drive engine 112 and shaft 114, respectively (both shown in FIG. 1). The exemplary embodiment of system 401 includes three generators 402 and three drive engines 412. Alternatively, system 401 includes any number of generators 402 and drive engines 412 that facilitates operation of marine vessel 400 as described herein.

In the exemplary embodiment, each of generators 402 include a plurality of stator windings (not shown in FIG. 8) that are substantially similar to windings 106, 108 and 110 (shown in FIG. 1). Each set of stator windings within each generator 402 is electrically coupled with a first electric power electronics apparatus, i.e., a first converter 416 via a plurality of electric conduits 420 and terminals (not shown). Each converter 416 includes a plurality of switching devices 417 wherein converters 416 and devices 417 are substantially similar to converter 116 and switching device 206 (both shown in FIG. 2). Moreover, plurality of conduits 420 and terminals are substantially similar to conduits 118, 120 and 122 and terminals 119, 121 and 123, respectively (all shown in FIG. 1). Converters 416 are controlled by a control system (not shown) similar to control system 220 (shown in FIG. 6).

Also, in the exemplary embodiment, system 401 includes a plurality of first DC links 424 wherein each link 424 is electrically coupled to a converter 416. Each link 424 includes a positive conduit 426, a negative conduit 428, and at least one capacitive device, or capacitor (not shown), electrically coupled therebetween. DC links 424 and conduits 426 and 428 and the capacitors are substantially similar to DC link 124, conduits 126 and 128, and capacitor 130, respectively (all shown in FIG. 1). In the exemplary embodiment, links 424 are configured to be energized to approximately 1000 VDC and are therefore low voltage DC links.

Further, in the exemplary embodiment, system 401 also includes a plurality of ship service DC buses 432 that are each electrically coupled to the plurality of first DC links 424. Specifically, each bus 432 includes a positive conduit 434 and a negative conduit 436 that are electrically coupled to positive conduits 426 and negative conduits 428, respectively. In the exemplary embodiment, system 401 includes two buses 432. Alternatively, system 401 includes any number of buses 432 coupled to any number of links 424. Capacitive devices (not shown) may be positioned between conduits 434 and 436 in a manner similar to capacitor 130. Buses 432 are substantially similar to bus 132 (shown in FIG. 1) and are configured to be routed throughout predetermined portions of marine vessel 400. In the exemplary embodiment, buses 432 are configured to be energized to approximately 1000 VDC and are therefore low voltage DC buses.

System 401 further includes two ship service converters 438 that are each electrically coupled to both buses 432. Specifically, each converter 438 includes a positive conduit 440 and a negative conduit 442 electrically coupled to at least one positive conduit 434 and at least one negative conduit 436, respectively. Converters 438 and conduits 440 and 442 are substantially similar to converter 138 and conduits 140 and 142, respectively (all shown in FIG. 1). System 100 also includes a plurality of sets of ship service AC conduits 444 wherein each set is electrically coupled to one converter 438. In the exemplary embodiment, each set of conduits 444 includes three conduits, i.e., one for each phase, wherein the conduits are configured to be routed throughout predetermined portions of marine vessel 400 and are also configured to be energized to approximately 450 VAC and is therefore a low voltage AC bus. System 401 is configured to include a plurality of electrical distribution and conditioning equipment that can feed ship service loads from conduits 444.

Generator 402 is also electrically coupled with a plurality of second electric power electronics apparatus, i.e., second converters 446 via a plurality of electric conduits 450 and a plurality of terminals (not shown). Conduits 450 and the terminals are substantially similar to conduits 148, 150 and 152 and terminals 149, 151 and 153, respectively, (all shown in FIG. 1). Converter 446 is an active rectifier that converts the AC signals transmitted from the stator windings into DC signals by AC rectification. In the exemplary embodiment, converter 446 is a pulse-width modulated rectifier. Converter 446 uses a plurality of switching devices 447 to control the stator windings output currents as is known in the art. Converters 446 and devices 447 are substantially similar to converter 146 and switching device 210 (both shown in FIG. 2). Converters 446 are controlled by a control system (not shown) similar to control system 230 (shown in FIG. 6).

System 401 also includes a plurality of second DC links 454 wherein each link 454 is electrically coupled to one converter 446. Each link 454 includes a positive conduit 456, a negative conduit 458, and at least one capacitive device, or capacitor (not shown), electrically coupled therebetween. DC links 454 and conduits 456 and 458 and the capacitors are substantially similar to DC link 154, conduits 156 and 158, and capacitor 160, respectively (all shown in FIG. 1). In the exemplary embodiment, links 454 are configured to be energized to approximately 10,000 VDC and are therefore medium voltage DC links.

System 401 further includes at least one ship's propulsion DC bus 462 that is electrically coupled to each of second DC links 454. Specifically, bus 462 includes a positive conduit 464 and a negative conduit 466 that are electrically coupled to each of positive conduits 456 and each of negative conduits 458, respectively. Alternatively, any number of buses 462 may be coupled to any number of links 454. Capacitive devices (not shown) may be positioned between conduits 464 and 466 in a manner similar to capacitor 160. Bus 462 is substantially similar to bus 162 (shown in FIG. 1) and is configured to be routed throughout predetermined portions of marine vessel 400. Moreover, bus 462 is configured to be electrically coupled to pulsed loads (not shown). In the exemplary embodiment, bus 462 is configured to be energized to approximately 10,000 VDC and is therefore a medium voltage DC bus.

System 401 also includes a plurality of ship's propulsion converters 468 that are electrically coupled to bus 462. Specifically, each converter 468 includes a positive conduit 470 and a negative conduit 472 electrically coupled to positive conduit 464 and negative conduit 466, respectively. Converters 468 and conduits 470 and 472 are substantially similar to converter 168 and conduits 170 and 172, respectively (all shown in FIG. 1).

System 401 further includes a plurality of ship's propulsion AC conduits 474 electrically coupled to converter 468. In the exemplary embodiment, there are three conduits 474, i.e., one for each phase, wherein conduits 474 are configured to be routed throughout predetermined portions of marine vessel 400. Conduits 474 are substantially similar to conduits 174 (shown in FIG. 1). In the exemplary embodiment, conduits 474 are also configured to be energized to approximately 6600 VAC and is therefore a medium voltage AC bus.

System 100 also includes a plurality of electric propulsion motors 476 that are each electrically coupled to one converter 468 via conduits 474. Each motor 476 is rotatably coupled to a propulsion shaft 478 and screw 480 wherein each motor 476 is configured to rotate associated screw 480 via associated shaft 478. Motors 476, shafts 478 and screws 480 are substantially similar to motor 176, shaft 178 and screw 180, respectively, (all shown in FIG. 1). Each converter 468 is configured to control the direction and speed of rotation of each associated motor 476 and thereby control the speed and direction of associated shaft 478 and screw 480.

Operation of system 401 is similar to operation of system 100. System 401 provides a plurality of benefits that include a significant reduction in a number of electric power distribution system transformers (not shown) Such a reduction, up to and including, elimination of electric power distribution system transformers facilitates a reduction of weight of vessel 400. The exemplary embodiment facilitates a reduction of weight that is approximately 226,800 kilograms (kg) (500,000 pounds (lbs)), or, 250 tons. Such a reduction in weight of vessel 400 facilitates a reduction in construction and operation costs as well as greater speed and fuel efficiency. Moreover, system 401 includes redundant ship service buses 432 and conduits 444. Furthermore, the exemplary electrical configuration of system 401 that includes not hard-paralleling generators 402 with each other facilitates a reduction in potential fault current values. Therefore, lower fault ratings of associated switchgear and cabling may be facilitated such that the size, weight and cost of these components can be reduced as well. Also, in the exemplary embodiment, a plurality of drive engines 412 coupled to generators 402 facilitates improved energy efficiency by allowing removal of unused drive and generating capacity from service during low usage periods. Furthermore, separating propulsion loads from ship service electric loads with a plurality of converters facilitates active filtering and power factor control. Also, using redundant components throughout system 401 facilitates decreasing an onboard spare parts inventory and facilitates simplified preventative and corrective maintenance methods. Moreover, using converters throughout system 401 facilitates leveraging likely future enhancements of converter technology.

Figure 9:
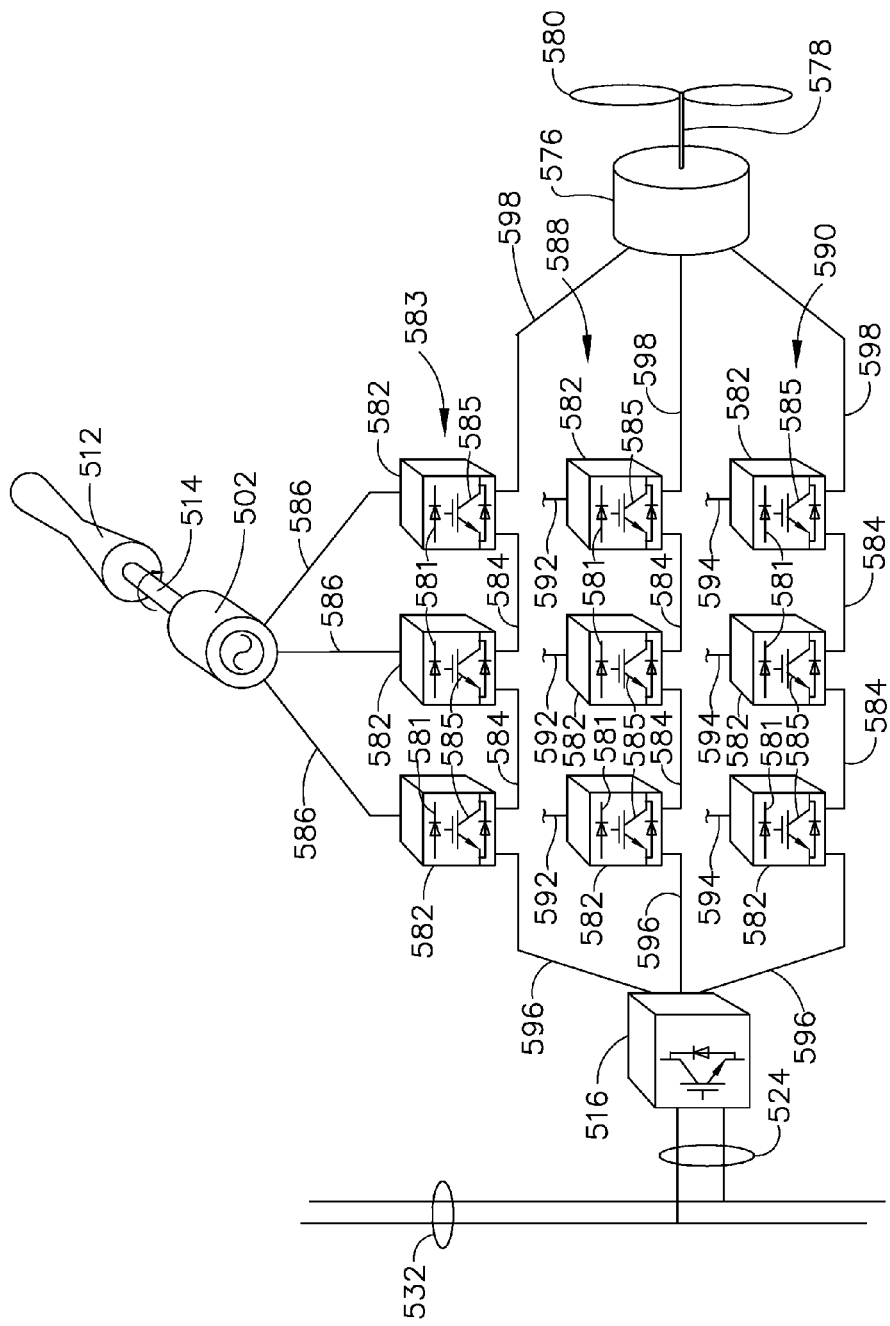
FIG. 9 is a schematic view of a portion of an alternative electric power generation and distribution system that may be used in the marine vessel shown in FIG. 8.

FIG. 9 is a schematic view of a portion of an alternative electric power generation and distribution system 501 that may be used in marine vessel 400 (shown in FIG. 8). System 501 includes at least one generator 502 driven by a drive engine 512 and a shaft 514. System 501 also includes a converter 516, DC link 524, DC bus 532, a propulsion motor 576, a shaft 578 and a screw 580. These components are similar to their counterparts in system 401 with the exception of generator 502 which is not necessarily an open-winding generator and may be any generator that facilitates operation of system 501 as described herein.

System 501 further includes a plurality of low voltage converter blocks 582. In the exemplary embodiment, blocks 582 include low voltage diodes 581 and switching devices 585. Each switching device 585 is similar to switching device 417 within converter 416 (both shown in FIG. 8). The benefit of using individual, stacked blocks 582 in contrast to a plurality of devices 417 within converter 416 is that the configuration of system 501 facilitates flexibility in component positioning within vessel 400. Also, system 501 facilitates flexibility in selecting levels of synthesizing the waveforms of the associated electrical signals (not shown), thereby facilitating power quality management. Furthermore, bypassing a failed block 582 while mitigating a reduction of system 501 capabilities is facilitated. Moreover, additional weight associated with structural components (not shown) of converter 416 may be eliminated, thereby enhancing the weight reduction benefits of system 401 as described above. Such weight reduction is further facilitated since blocks 582 are placed in series which facilitates compounding the voltages from block 582 to block 582 in contrast to a parallel configuration in converter 416, thereby facilitating some reduction in size of the associated IGBT-based switching device configurations (not shown).

System 501 includes a first set 583 of three blocks 582 electrically coupled in series to each other via electric conduits 584. Moreover, each block 582 is coupled to a phase winding (not shown) of generator 502 via a conduit 586. Similarly, system 501 includes two additional sets of three blocks 582 that are substantially similar to the first set of blocks 582 in that they are electrically coupled in series by conduits 584. The second set 588 and third set 590 differ from first set 583 in that the associated blocks 582 of sets 588 and 590 may be electrically coupled to the windings of a second and third generator, respectively (not shown), or to a different set of windings (not shown) associated with generator 502. The additional generators are each substantially similar to generator 502 and are electrically coupled to their associated blocks via conduits 592 and 594, respectively.

System 501 also includes a plurality of conduits 596, i.e., one for each set 583, 588 and 590, electrically coupled to converter 516. Similarly, system 501 also includes a plurality of conduits 598 electrically coupling sets 583, 588 and 590 to motor 576.

In operation, generator 502 is driven via engine 512 and shaft 514 and a predetermined alternating electric current at a predetermined voltage is generated in each phase of generator 502. The current from each phase is transmitted though conduits 586 to each block 582. Each block 582 receives the AC signal transmitted via each associated conduit 586 and converts the received signal to an electric signal with a predetermined waveform that includes, but is not limited to, a predetermined voltage amplitude and a predetermined phase angle.

The converted signals are transmitted from blocks 582 to conduits 584 wherein the transmitted signals are summed within set 583 and further transmitted to conduits 596 and 598 at predetermined proportions. Similar operations are performed within sets 588 and 590 in conjunction with the associated generators. In this alternative embodiment, the combined voltages may sum to 7200 VAC. The system 501 configuration including the three sets 583, 588 and 590 of blocks 582 facilitates flexibility in proportioning generation and distribution within each set.

Further, in operation, a proportioned amount of the electric power generated within the three sets 583, 588 and 590 is transmitted to converter 516 wherein the AC signals are converted to DC signals as described above. Also, a proportioned amount of the electric power generated is transmitted to motor 576 as a plurality of single-phase AC signals for operation of motor 576, shaft 578 and screw 580 as described above.

Figure 10:
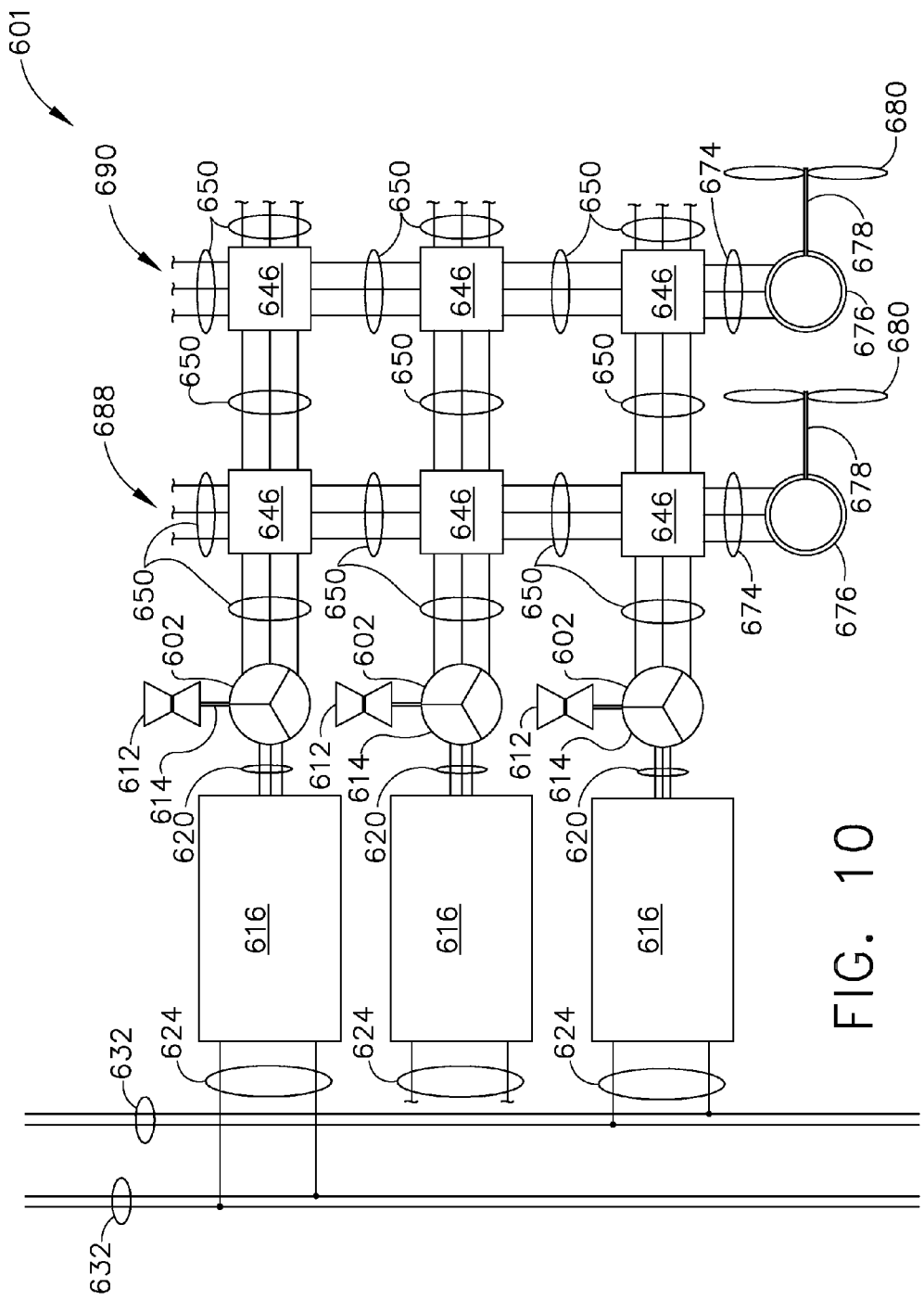
FIG. 10 is a schematic view of a portion of an alternative electric power generation and distribution system that may be used in the marine vessel shown in FIG. 8.

FIG. 10 is a schematic view of a portion of an alternative electric power generation and distribution system 601 that may be used in marine vessel 400 (shown in FIG. 8). System 601 includes three open-winding, 7000 RPM, 200 Hertz (Hz) generators 602 each driven by an engine 612 and a shaft 614. Engines 612 and shafts 614 are substantially similar to engine 412 and shaft 414 (both shown in FIG. 8). One end of each of the windings (not shown) within each generator 602 is electrically coupled to an associated converter 616 via a set of conduits 620. Each converter 616 is similar to converter 416 with the exception that converter 616 includes additional filtering apparatus (not shown) to mitigate cycloconverter harmonics. Each converter 616 is coupled to a ship service DC bus 632 via an associated DC link 624.

System 601 also includes a plurality of converters 646 that are configured as cycloconverters or matrix converters. Converters 646 are each coupled to generators 602 and to each other in a grid-like fashion via a plurality of conduits 650. A first string 688 of converters and a second string 690 of converters are each coupled to an associated propulsion motor 676 via a plurality of conduits 674, wherein each motor is configured to drive a shaft 678 and screw 680.

The benefits of system 601 are substantially similar to those of system 401. In addition, such multi-generator configuration facilitates flexibility in proportioning the outputs of generators 602 to each motor 676 and DC bus 632 in a manner similar to that of system 401. Moreover, the multi-converter strings configuration enhances such flexibility by facilitating further apportionment of the output of generators 602 via strings 688 and 690. Also, system 601 facilitates flexibility in selecting levels of synthesizing the waveforms of the associated electrical signals, thereby facilitating power quality management. Furthermore, bypassing a failed converter 646 while mitigating a reduction of system 601 capabilities is facilitated. Moreover, additional weight associated with structural components (not shown) of converter 416 may be eliminated, thereby enhancing the weight reduction benefits of system 401 as described above. Furthermore, SCRs can be used in converters 646 and are typically more rugged that many other alternative switching devices and therefore, ridethrough of fault conditions is facilitated.

Figure 11:
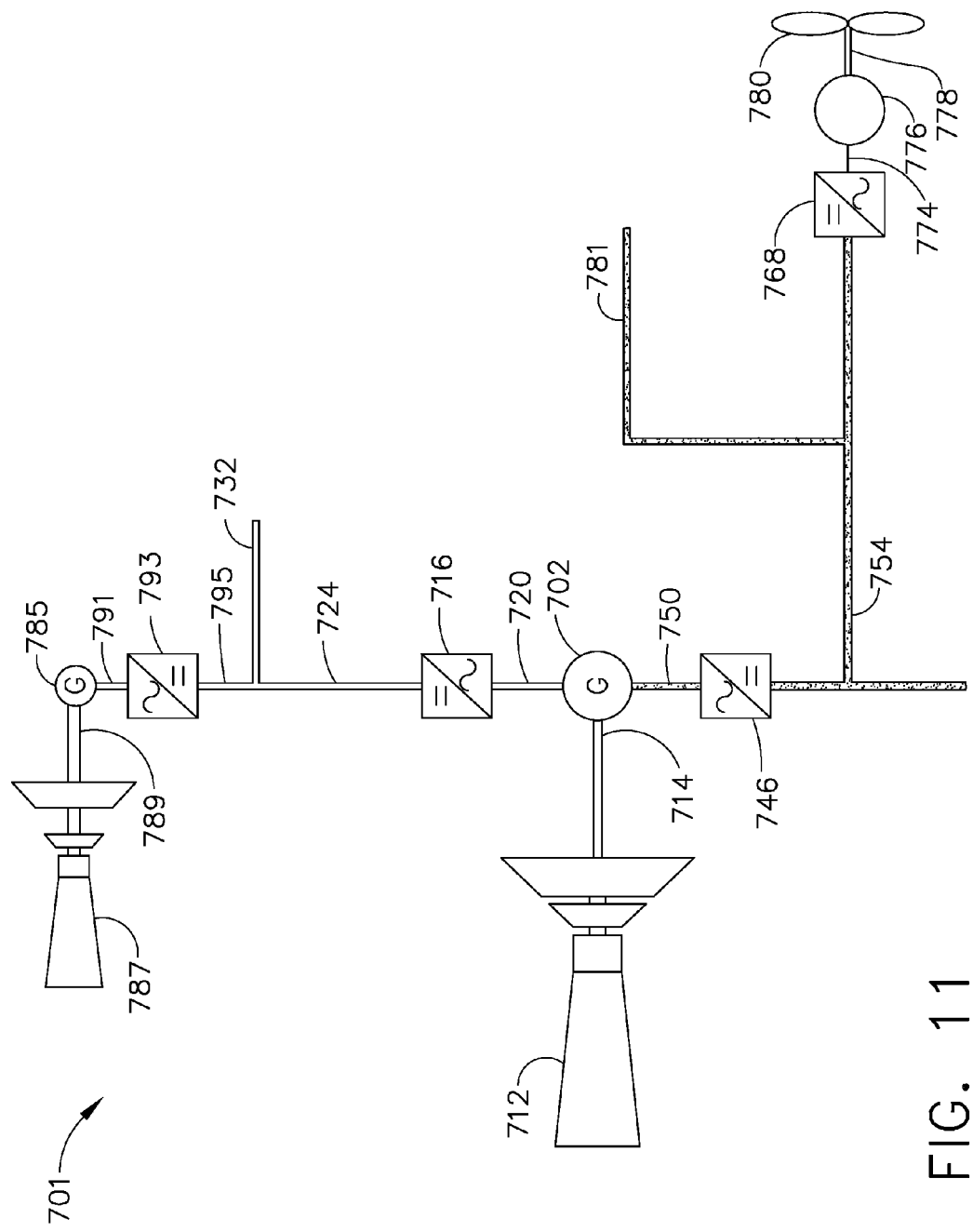
FIG. 11 is a schematic view of a portion of an alternative electric power generation and distribution system that may be used in the marine vessel shown in FIG. 8.

FIG. 11 is a schematic view of a portion of an alternative electric power generation and distribution system 701 that may be used in marine vessel 400 (shown in FIG. 8). System 701 includes an open-winding generator 702 that is driven by engine 712 and shaft 714. Generator 702 is substantially similar to generator 402 (shown in FIG. 8). Generator 702 is electrically coupled to a propulsion motor 776 via a conduit 750, a converter 746, a DC link 754, a converter 768 and a conduit 774 in a manner similar to the associated components of system 401. In this alternative embodiment, converter 746 is configured to energize DC link 754 to approximately 6000 to 10,000 VDC. Motor 776 is configured to drive a screw 780 via a shaft 778. Moreover, generator 702 is electrically coupled to a ship service DC bus 732 via a converter 716 and a conduit 720 and a DC link 724 in a manner substantially similar to the associated components of system 401.

System 701 also includes a high power conduit 781 electrically coupled to DC link 754 that may include, but not be limited to, a high power weapons conduit in the event vessel 400 is a warship. System 701 further includes a low voltage generator 785. Generator 785 generates low voltage electric power at a voltage of approximately 690 VAC. Generator 785 is rotatably coupled to a low-power drive engine 787 via a shaft 789. Generator 785 is electrically coupled to bus 732 via a conduit 791, a converter 793 and a DC link 745. Converter 793 is substantially similar to converter 716. System 701 has substantially similar benefits as system 401. In addition, system 701 accommodates high-speed and low speed turbo-generators and allows ship service power to be maintained from generator 785 if power cannot be accessed from generator 702 due to shutdown, faults or other reasons for isolation. System 701 also accommodates electrically coupling low power fuels cells (not shown) to bus 732.

Figure 12:
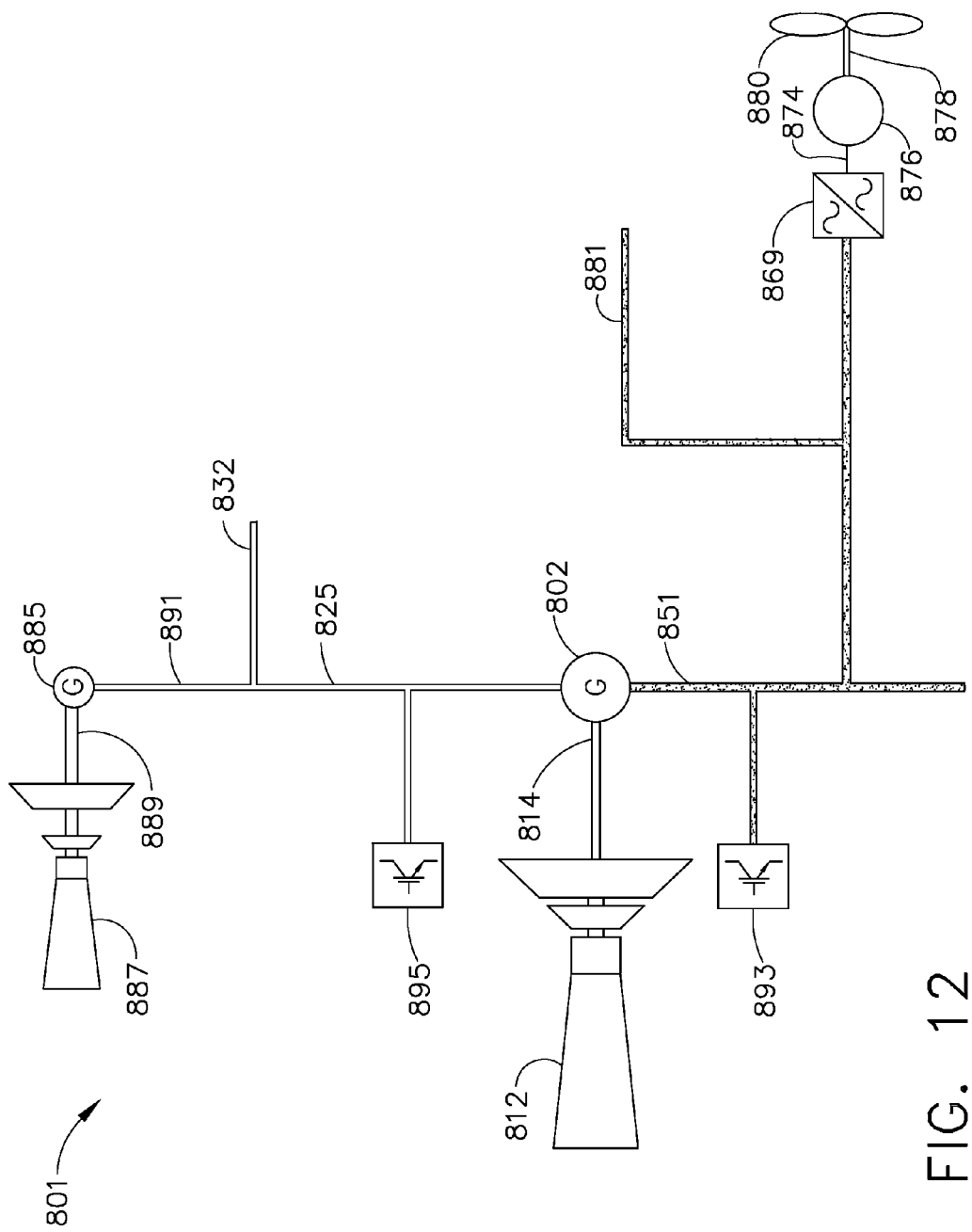
FIG. 12 is a schematic view of a portion of an alternative electric power generation and distribution system that may be used in the marine vessel shown in FIG. 8.

FIG. 12 is a schematic view of a portion of an alternative electric power generation and distribution system 801 that may be used in marine vessel 400 (shown in FIG. 8). System 801 includes an open-winding generator 802 that is driven by engine 812 and shaft 814. Generator 802 is substantially similar to generator 402 (shown in FIG. 8). Generator 802 is electrically coupled to a propulsion motor 876 via an AC bus 851, a converter 869 and a conduit 874. In this alternative embodiment, the AC voltage on bus 851 is conditioned via a first bus conditioner 893 that is electrically coupled to bus 851. Moreover, converter 869 is configured to receive a first AC signal (not shown) and convert the characteristics of the signal including, but not limited to, amplitude and frequency, to generate a second AC signal. Motor 876 is configured to drive a screw 880 via a shaft 878. Moreover, generator 802 is electrically coupled to a ship service DC bus 832 via an AC bus 825. A second bus conditioner 895 that is electrically coupled to bus 825 conditions the AC voltage signals on bus 825. Bus conditioners 893 and 895 are controlled to regulate the proportioning of the generator voltage to the propulsion-side bus 851 and ship service side bus 825.

System 801 also includes a high power conduit 881 that may include, but not be limited to, a high power weapons conduit in the event vessel 400 is a warship. System 801 further includes a low voltage generator 885. Generator 885 generates low voltage electric power at a voltage of approximately 690 VAC. Generator 885 is rotatably coupled to a low-power drive engine 887 via a shaft 889. Generator 885 is electrically coupled to bus 832 via a conduit 891. System 801 has substantially similar benefits as system 701.

The methods and apparatus for generating and distributing electric power as described herein facilitates operation of electric power distribution systems. Specifically, configuring a shipboard generation and distribution system network with a plurality of electric power converters facilitates reducing a number of electric power transformers to facilitate distributing electric power in a variety of voltages throughout the vessel. More specifically, such configuration facilitates weight reduction of such vessels, thereby facilitating vessel speed attainment and fuel efficiency. Such configuration also facilitates propulsion reliability and ship service electric reliability by providing multiple levels of redundancy and facilitating electrical fault ride-through. Moreover, troubleshooting, repairing and/or replacing the faulted components is facilitated thereby reducing the total cost of ownership of the system. Furthermore, the method and equipment for operating systems as described herein facilitates reducing hardware procurement, installation, and configuration, therefore reducing capital and labor costs associated with installing such systems. Specifically, configuring the systems with less and smaller transformers and less heavy switchgear facilitates decreasing installation and maintenance costs.

Exemplary embodiments of generating and distributing electric power are described above in detail. The methods, apparatus and systems are not limited to the specific embodiments described herein nor to the specific illustrated systems and system components.

The described method of producing and distributing electric power at multiple voltages can also be used in applications such as dual voltage automotive architectures and space-constrained applications such as off-shore oil platforms where transformers may have the disadvantage of large size and weight.

While the invention has been described in terms of various specific embodiments, those skilled in the art will recognize that the invention can be practiced with modification within the spirit and scope of the claims.

What is claimed is:

1. A method of generating electric power, said method comprises:
    providing at least one open-winding generator having a plurality of windings, wherein each of the plurality of windings has a first terminal and a second terminal;
    electrically coupling each first terminal to a first electric power electronics apparatus via a first electric bus and electrically coupling each second terminal to a second electric power electronics apparatus via a second electric bus;
    inducing and regulating a first voltage on the first electric bus; and
    inducing and regulating a second voltage on the second electric bus.

2. A method in accordance with claim 1 wherein electrically coupling the first terminal to a first electric power electronics apparatus comprises:
    electrically coupling the first electric power electronics apparatus to a first alternating current (AC) bus and to a first direct current (DC) bus; and
    electrically coupling the second electric power electronics apparatus to a second AC bus and to a second DC bus.

3. A method in accordance with claim 1 wherein inducing a first voltage on the first electric bus comprises:
    inducing a first AC voltage on the first AC bus;
    inducing a first DC voltage on the first DC bus; and
    inducing a second AC voltage on a second AC bus.

4. A method in accordance with claim 3 wherein inducing a first DC voltage on the first DC bus comprises:
    maintaining the first AC voltage at a predetermined value with the first power electronics apparatus; and
    converting the first AC voltage to the first DC voltage via the first power electronics apparatus.

5. A method in accordance with claim 3 wherein inducing a second AC voltage on a second AC bus comprises:
    controlling the first DC voltage with the first electric power electronics apparatus; and
    converting the first DC voltage to a third AC voltage via a third electric power electronics apparatus.

6. A method in accordance with claim 3 further comprising:

inducing a third AC voltage on a third AC bus, wherein the third AC voltage is greater than the first AC voltage;

inducing a second DC voltage on a second DC bus, wherein the second DC voltage is greater than the first DC voltage; and inducing a fourth AC voltage on a fourth AC bus, wherein the fourth AC voltage is greater than the third AC voltage.

7. An electric power distribution system comprising:
at least one first electric power electronics apparatus electrically coupled to a first electric bus;
at least one second electric power electronics apparatus electrically coupled to a second electric bus; and
at least one poly-phase open-winding generator electrically coupled in series with said first electric bus and said second electric bus.

8. An electric power distribution system in accordance with claim 7 wherein said poly-phase open-winding generator comprises:
a rotor; and
a stator extending around at least a portion of said rotor, said stator comprising at least one winding, wherein said at least one winding comprises a first electric terminal coupled to said first bus and a second electric terminal coupled to said second bus.

9. An electric power distribution system in accordance with claim 8 wherein said at least one winding comprises a plurality of electrically independent windings electrically coupled to said first bus and to said second bus such that said first bus and said second bus are substantially electrically synchronized.

10. An electric power distribution system in accordance with claim 7 wherein said open-winding generator is configured to induce a first voltage on said first bus and induce a second voltage on said second bus, wherein a sum of the first and second voltages is approximately equal to a total voltage output of said poly-phase open-winding generator.

11. An electric power distribution system in accordance with claim 10 wherein said first voltage is less than said second voltage.

12. An electric power distribution system in accordance with claim 7 wherein each of said at least one first and second electric power electronics apparatus comprise a plurality of converters configured to control the first voltage and the second voltage, said plurality of converters comprise at least one switching device.

13. An electric power distribution system in accordance with claim 12 wherein said plurality of converters are electrically coupled to a plurality of direct current (DC) buses, wherein said plurality of converters are configured to control a voltage on said plurality of DC buses.

14. A vessel comprising:
at least one electric propulsion motor; and
an electric power distribution system electrically coupled to said at least one electric propulsion motor, said electric power distribution system comprises:
at least one first electric power electronics apparatus electrically coupled to a first electric bus;
at least one second electric power electronics apparatus electrically coupled to a second electric bus; and
at least one poly-phase open-winding generator electrically coupled in series with said first electric bus and said second electric bus.

15. A vessel in accordance with claim 14 wherein said open-winding generator comprises:
a rotor; and
a stator extending around at least a portion of said rotor, said stator comprising at least one winding, wherein said at least one winding comprises a first electric terminal coupled to said first bus and a second electric terminal coupled to said second bus.

16. A vessel in accordance with claim 14 wherein said at least one winding comprises a plurality of electrically independent windings electrically coupled to said first bus and to said second bus such that said first bus and said second bus are substantially electrically synchronized.

17. A vessel in accordance with claim 14 wherein said open-winding generator is configured to induce a first voltage on said first bus and induce a second voltage on said second bus, wherein a sum of the first and second voltages is approximately equal to a total voltage output of said poly-phase open-winding generator.

18. A vessel in accordance with claim 14 wherein each of said at least one first and second electric power electronics apparatus comprise a plurality of converters configured to control the first voltage and the second voltage, said plurality of converters comprise at least one switching device.

19. A vessel in accordance with claim 18 wherein said plurality of converters are electrically coupled to a plurality of direct current (DC) buses, wherein said plurality of converters are configured to control a voltage on said plurality of DC buses.

20. A vessel in accordance with claim 19 wherein said at least one electric propulsion motor is coupled to at least one of said plurality of DC buses.

* * * * *